(12) United States Patent
Ewald et al.

(10) Patent No.: US 6,350,325 B1
(45) Date of Patent: Feb. 26, 2002

(54) TURBINE SHAFT AND METHOD FOR PRODUCING A TURBINE SHAFT

(75) Inventors: Jürgen Ewald, Mülheim; Torsten-Ulf Kern, Wesel, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/145,215

(22) Filed: Aug. 31, 1998

Related U.S. Application Data

(63) Continuation of application No. PCT/DE97/00307, filed on Feb. 19, 1997.

(30) Foreign Application Priority Data

Feb. 29, 1996 (DE) .......................................... 196 07 736
Jul. 15, 1996 (DE) .......................................... 198 28 506

(51) Int. Cl.$^7$ ................................................. F02C 3/073
(52) U.S. Cl. ....................... 148/325; 428/683; 415/200; 415/216.1
(58) Field of Search ........................ 148/325; 164/496; 415/216.1, 200; 416/241 R, 244 R, 244 A; 428/685, 683

(56) References Cited

U.S. PATENT DOCUMENTS

| | | | | |
|---|---|---|---|---|
| 4,815,521 A | * | 3/1989 | Sakai et al. .................. | 164/496 |
| 5,779,821 A | * | 7/1998 | Ishii et al. .................... | 148/325 |
| 5,961,284 A | * | 10/1999 | Kuriyama et al. .......... | 415/200 |
| 6,174,132 B1 | * | 6/2001 | Shiga et al. ................. | 148/325 |

* cited by examiner

*Primary Examiner*—George Wyszomierski
(74) *Attorney, Agent, or Firm*—Herbert L. Lerner; Laurence A. Greenberg; Werner H. Stemer

(57) ABSTRACT

A turbine shaft, in particular for a steam turbine, is oriented along an axis of rotation. The turbine shaft has a first region with a maximum radius $R_1$ and a second region adjoining the first region and having a maximum radius R2>R1. The first region includes a first base material for use at a temperature of over 550° C. and the second region includes a second base material for use at a temperature below 550° C. An alloy steel used for the first and the second base materials in each case has a chromium content of between 8.0% by weight and 12.5% by weight at a substantially identical austenitizing temperature. A method is provided for producing the turbine shaft.

19 Claims, 1 Drawing Sheet

TURBINE SHAFT AND METHOD FOR PRODUCING A TURBINE SHAFT

CROSS-REFERENCE TO RELATED APPLICATION

This application is a continuation of International Application No. PCT/DE97/00307, filed on Feb. 19, 1997, which designated the United States.

BACKGROUND OF THE INVENTION

Field of the Invention

The invention relates to a turbine shaft, in particular for a steam turbine, which is oriented along an axis of rotation and has a first axially oriented region with a maximum radius R1 and a second axially oriented region adjoining the first axially oriented region and having a maximum radius R2. U.S. Pat. No. 3,767,390 describes a martensitic special steel for high-temperature applications, for example for producing steam-turbine blades or bolts for connecting two halves of a steam-turbine casing. That steel preferably has a content (all of the following data are given in per cent by weight) of 12% chromium and approximately 0.3% niobium. The addition of niobium is intended to increase the creep rupture strength and largely remove δ-ferrite from the steel. In a preferred embodiment, the steel described therein has, as further alloying constituents, 0.25% Co, 4% Mn, 0.35% Si, 0.75% Ni, 1.0% Mo, 1.0% W, 0.3% V, 0.75%o N, as well as a remainder of iron and impurities of sulfur, phosphorus and nitrogen.

An article entitled "Development and Production of High Purity 9Cr1MoV Steel for High Pressure—Low Pressure Rotor Shaft" by T. Azuma, Y. Tanaka, T. Ishiguro, H. Yoshita and Y. Iketa, in Conference Proceedings of Third International Turbine Conference, 25–27 April 1995, Civic Centre, Newcastle upon Tyne, Great Britain, "Materials Engineering in Turbines and Compressors", publisher A. Strang, pages 201 to 210, describes a steel for a combined high-pressure and low-pressure steam-turbine shaft. The steel is said to be suitable for the production of such a turbine shaft from a single material. In a preferred embodiment, it has a composition of 9.8% chromium, 1.3% nickel, 0.16% carbon, less than 0.1% silicon, less than 0.1% manganese, 1.4% molybdenum, 0.21% vanadium, 0.05% niobium, 0.04% nitrogen, and a remainder of iron and impurities of phosphorus, sulfur, aluminum, arsenic, tin, antimony.

The high-pressure part of the turbine shaft has a diameter of 1200 mm and the low-pressure part has a diameter of 1750 mm. The turbine shaft as a whole is produced from a blank having a diameter of 1800 mm.

SUMMARY OF THE INVENTION

It is accordingly an object of the invention to provide a turbine shaft, in particular for a steam turbine, and a method for producing a turbine shaft, which overcome the hereinafore-mentioned disadvantages of the heretofore-known devices and methods of this general type and in which the turbine shaft is suitable for high thermal stresses with a temperature profile that decreases in axial direction, with a maximum temperature of over 550° C.

With the objects of the invention in view, there is also provided a turbine shaft, in particular for a steam turbine, oriented along an axis of rotation, comprising a first axially oriented region with a first maximum radius; a second axially oriented region adjoining the first axially oriented region and having a second maximum radius greater than the first maximum radius; the first region including a first base material for use at a first temperature, the second region including a second base material for use at a second temperature lower than the first temperature; and the base materials having an alloy steel containing 8.0% by weight to 12.0% or 12.5% by weight Cr with substantially identical austenitizing temperatures. The first base material is suitable for use at a higher temperature, in particular of over 550° C. and the second base material is suitable for use at a lower temperature, in particular between 350° C. and 550° C.

In accordance with another feature of the invention, the first base material has a lower content, in percent by weight, of nickel than the second base material, in particular a nickel content which is lower by more than 0.1%. The content of nickel, in percent by weight, is between 0.1% and 1.8% for each base material, preferably 1.0% to 1.5% nickel, preferably 1.3% for the second base material, and 0.2% to 0.6% nickel for the first base material. The chromium content of the first base material, in particular for a high-pressure part of a steam turbine, is (data in percent by weight) 10% to 12% and the chromium content of the second base material, in particular for a low-pressure part of a steam turbine, is (data in percent by weight) 9.5% to 10.5%, preferably 9.8%.

In the case of a turbine shaft which has alloy steels that are different in regions but have identical austenitizing temperatures and, in the first region having a smaller cross-section, has a base material with an optionally higher chromium content and a lower nickel content than in the second region having a larger cross-section, a high hot strength, a high creep rupture strength and a sufficient fracture toughness are achieved in the first region. In the second region, high yield strength demands are fulfilled and a very good notched impact strength and fracture toughness are ensured. A required yield strength $R_{p02}$ may be, for example, around 720 MPa $\sqrt{m}$. The fracture toughness is, for example, about 200 MPa and, with regard to the toughness, it can be stated that the FATT is less than 25° C. Due to the high hot strength of the first region, the latter is suitable as a high-pressure part of a combined high-pressure/low-pressure steam turbine, even at steam admission temperatures of over 550° C. to about 650° C. The second region is preferably suitable for use at temperature stresses of 350° C. to about 550° C. Different choices of the chromium and nickel content in the first region and the second region permit the high heat resistance in the first region and the toughness in the second region to be set selectively, largely independently of one another, depending on the demands placed on the materials. In contrast to a turbine shaft which is produced from a single material, there is no need to compromise between creep rupture strength in the thermally higher stressed region and toughness in the second region, which is subjected to slightly less thermal stress. In addition, as a result of having base materials of similar composition, the problem of the base materials having significantly different material properties mixing in a transition zone between the first region and the second region does not arise. Along the axis of rotation, the turbine shaft has different thermomechanical properties in regions with specifically selected different chemical compositions. In this case the regions can be produced by melting down differently alloyed electrodes by the electro-slag remelting process (ESR process).

Due to the essentially identical austenitization temperature, the material properties in the transition zone between the first region and the second region change slightly, at most. They are thus largely independent of the respective chemical composition. A similar composition of the main carbide-forming elements and main nitride-forming elements, such as C, N, V, Nb, Mo, W in the base materials results in the essentially uniform austenitizing temperature for the entire turbine shaft. This means that, in contrast to turbine shafts having significantly different base materials, the first region can be austenitized at the same temperature as the second region. A different temperature treatment, in particular for a high-pressure and low-pressure part of a steam-turbine shaft, would have a negative effect on the respective austenitizing operations.

It is now possible to produce a largely ferrite-free structure of the entire turbine shaft in one operating step.

The following stabilizing and tempering temperatures only differ from one another slightly. Moreover, using different tempering temperatures for various regions in the axial direction of the turbine shaft presents no technical problems.

In accordance with a further feature of the invention, the austenitizing temperature is in a range from 950° C. to 1150° C., in particular approximately 1050° C.

In accordance with an added feature of the invention, the first base material includes (data in per cent by weight) 0 to 3% tungsten, 0 to 3% cobalt and/or 0 to 2% rhenium.

In accordance with an additional feature of the invention, the tungsten content is preferably between 2.4% and 2.7% and/or the cobalt content is preferably between 2.4% and 2.6%. The addition of rhenium makes it possible to increase the creep rupture strength.

In accordance with yet another feature of the invention, the first base material includes, as further alloying components, (data in per cent by weight):
0% to 0.5% Mo, preferably 0.15% to 0.25%,
0.1% to 0.3% V, preferably 0.15% to 0.25%,
0.02% to 0.18% Nb, preferably 0.04% to 0.08%,
0.05% to 0.25% C, preferably 0.08% to 0.12%,
0.01% to 0.07% N, preferably 0.015% to 0.045%.
and deoxidizing elements, such as <0.15% Si, <0.7% Mn, preferably 0.4% to 0.6%, and a remainder of iron and possibly production-related impurities, in particular of phosphorus, antimony, tin, aluminum, arsenic and sulfur.

The first base material may be a high-purity (superclean, ultrasuperclean) alloy steel having a very low impurities content. Such alloy steels, in particular for 12% chromium steels, are described, for example, in a conference report entitled "Clean Steel, Super Clean Steel" Mar. 6–7, 1995, Copthorne Tara Hotel, London, Great Britain, in an article entitled "The EPRI Survey on Superclean Steels" by J. Nutting, in particular in Table 1, and also in an article entitled "Development of Production Technology and Manufacturing Experiences with Super Clean 3,5 NiCrMoV Steels" by W. Meyer, R. Bauer and G. Zeiler in particular in the tables relating to the 12% chromium steel (Böt550S0).

In accordance with yet a further feature of the invention, at least the first base material, i.e. the base material for the region with the smaller radius and high hot strength, includes, as a further alloying component, up to 0.03% by weight, in particular 0.005% by weight to 0.02% by weight, boron.

In accordance with yet an added feature of the invention, the second base material includes, as further alloying elements:

1.0% to 1.6% Mo, preferably 1.4%,
0.15% to 0.25% V, preferably 0.21%,
0.03% to 0.07% Nb, preferably 0.05%,
0.03% to 0.06% N, preferably 0.04%,
up to 0.1% Si,
0.1 to 0.2% C, preferably 0.16%, and up to 0.2% Mn.

In accordance with yet an additional feature of the invention, the turbine shaft is suitable for use in a steam turbine, the first region serves to receive rotor blades of a high-pressure part of the steam turbine and the second region serves to receive rotor blades of a low-pressure part of the steam turbine. In this case, during operation of the steam turbine, the high-pressure part may be subject to a steam temperature of 550° C. to 650° C., which requires a good hot strength of the first region, primarily in the region close to the surface.

Lower temperatures prevail in the vicinity of the axis of rotation than at the surface so that, if desired, a core region made of a base material having a lower hot strength, for example the second base material, may also be formed close to the axis in the high-pressure part. The second region, which forms the low-pressure part of the steam turbine and has a larger radius than the first region, is subject to higher mechanical stresses than the high-pressure part, in particular due to the larger low-pressure rotor blades and its own larger radius. A high toughness, in particular fracture toughness, is therefore required for the low-pressure part, which is achieved by a suitable choice of the alloying components (higher nickel content, optionally lower chromium content) of the second base material. The thermal stressing of the low-pressure part in this case is preferably below 500° C., in particular below 480° C. The yield strength may be over 720 MPa.

In accordance with again another feature of the invention, in view of the decreasing temperature in the turbine shaft radially in the direction of the axis of rotation in the event of a surface temperature stressing, the first region has a core region close to the axis which is surrounded by a shell region. The shell region preferably is formed of the first base material and thus has the required hot strength. The core region preferably is formed of the second base material or a third base material which also has a good hot strength. In this case the core region may be produced by electro-slag remelting of an appropriately alloyed electrode or electrodes.

The maximum radius R1 of the first region, the high-pressure part, is preferably between 350 mm and about 750 mm. The maximum radius R2 of the second region, i.e of the low-pressure part, is preferably between 700 mm and 1000 mm.

With the objects of the invention in view, there is also provided a method for producing the turbine shaft, which comprises producing the first region by melting down at least one electrode made of the first base material; and producing the second region by melting down at least one electrode made of the second base material; and simultaneously joining the first and second regions to one another. The melting may be performed, for example, by an ESR process.

The entire shaft can be produced in a single operation, in which case firstly electrodes made of the first base material and then electrodes made of the second base material are melted down, or vice versa. A turbine-shaft blank produced in this way may be brought to the appropriate radii of the first region and of the second region, for example by forging. The heat treatment of a combined turbine shaft produced by the ESR process may take place in a similar manner for the first region and the second region. A preheating treatment is carried out at about 1100° C. for a period of about 26 hours and is continued by a furnace cooling to about 680° C. This is followed, depending on the diameter of the shaft, by a quality heat treatment at the austenitizing temperature of about 1070° C. for a period of about 33 hours. This is followed by tempering, for example for a period of about 24 hours, at a temperature of between 650° C. and 680° C., whereby it is possible to produce different tempering temperatures according to region.

In accordance with another mode of the invention, the first region is produced with a core region which is made of the second base material and extends around the axis of rotation by filling a hollow cylinder formed from the first base material with the second base material by melting down one or a number of electrodes. The hollow cylinder made of the first base material may be produced by conventional forging processes. When filling the hollow cylinder with the second base material or a third base material with high hot strength, for example through the use of the electro-slag remelting process (ESR process), the blank mold of the first region produced in this way can be welded to the solidifying ESR melt pool. It is also possible to overgrow the first region on the second region.

In accordance with a concomitant mode of the invention, the second region, the low-pressure part, is made by filling a hollow cylinder being formed of the second base material with the first base material or a further base material.

Other features which are considered as characteristic for the invention are set forth in the appended claims.

Although the invention is illustrated and described herein as embodied in a turbine shaft and a method for producing a turbine shaft, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1A:
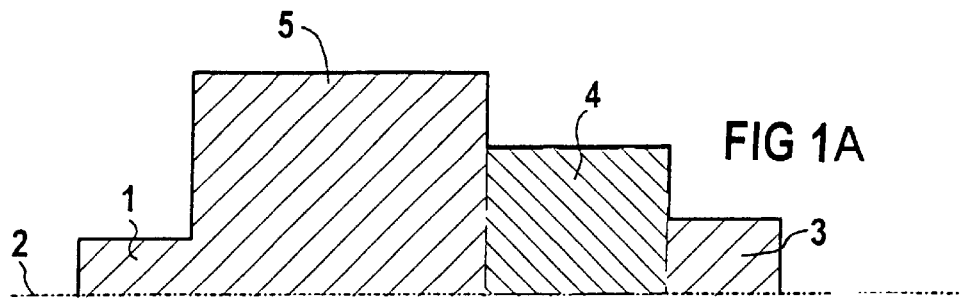
FIGS. 1A and 1B are diagrammatic, sectional views of a steam-turbine shaft oriented along an axis of rotation.
Figure 1B:
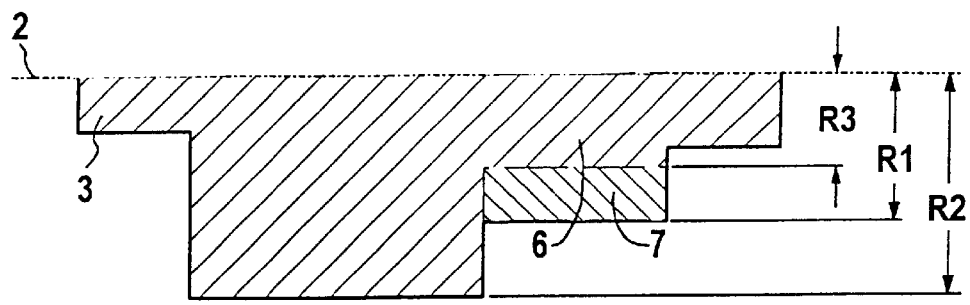

Referring now to the figures of the drawings in detail and first, particularly, to FIGS. 1a and 1b thereof, there are seen two different embodiments of a turbine shaft 1 oriented along an axis 2 of rotation. The turbine shaft 1 has a first region 4, which is rotationally symmetrical with respect to the axis of rotation, forms a high-pressure part and has a radius R1. The first region 4 is adjoined by a second region 5, which forms a low-pressure part and has a larger radius P2 than the first region 4. Ends 3 of the turbine shaft 1 which respectively adjoin the first region 4 and the second region 5, serve for mounting.

In the first embodiment, which is depicted in FIG. 1a above the axis 2 of rotation, the first region 4 is produced completely from a first base material, which has a high hot strength, so that the turbine shaft 1 is suitable for use at steam admission temperatures of about 550° C. to about 650° C.

The first base material has a chromium content of about 10.5 per cent by weight and a nickel content of about 0.75 per cent by weight. In addition to further alloying constituents, it may include up to 3.0% by weight tungsten, up to 2.0% by weight rhenium and an admixture of 0.005% by weight to 0.02% by weight boron. The second region 5 is made of a second base material, the chemical composition of which is similar to that of the first base material. The chromium content is about 9.8 per cent by weight and the nickel content is about 1.3 per cent by weight. Both base materials have essentially the same austenitizing temperature.

In the second embodiment of the turbine shaft 1, which is depicted in FIG. 1b below the axis 2 of rotation, the first region 4 has an axial core region 6 with a radius R3, that is smaller than the radius R1. This core region 6 is formed from the second base material. The core region 6 is enclosed by a shell region 7, being formed of the first base material. As a result, the turbine shaft 1 has the desired hot strength in that region of the first region 4 which is close to the surface and is subject to high steam temperatures. In the region close to the axis, i.e. the core region 6, the temperatures are lower, so that the hot strength of the second base material is sufficient, and thus the core region 6 additionally has the high fracture toughness of the second base material.

Figure 2:
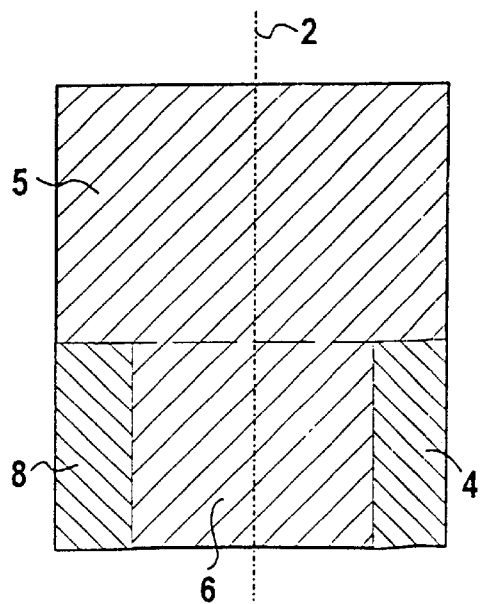
FIGS. 2 and 3 are sectional views of a blank for a steam-turbine shaft.

FIG. 2 shows a blank which is oriented along an axis 2 of rotation or main axis of a turbine shaft. The blank has a first region 4, on which a second region 5 is applied along the main axis 2. The first region 4 has a hollow cylinder 8 made of the first, high-temperature resistant base material. Non-illustrated electrodes made of the second base material are melted down by the ESR process into the interior, core region 6 of the hollow cylinder 8, so that the core region 6 is gradually filled with the second base material. The second base material thus forms the core region 6 close to the axis in the first region 4. The hollow cylinder or shell region 8 is preferably produced, in particular forged, in a conventional manner as a rotationally symmetrical hollow cylinder. The second region 5 is formed by overgrowing the second base material onto the first region 4 and the core region 6 by the ESR process. It is possible to produce a turbine shaft 1 in accordance with FIG. 1 (second embodiment) from the blank shown in FIG. 2, by forging. The ends 3 can be welded on subsequently.

Figure 3:
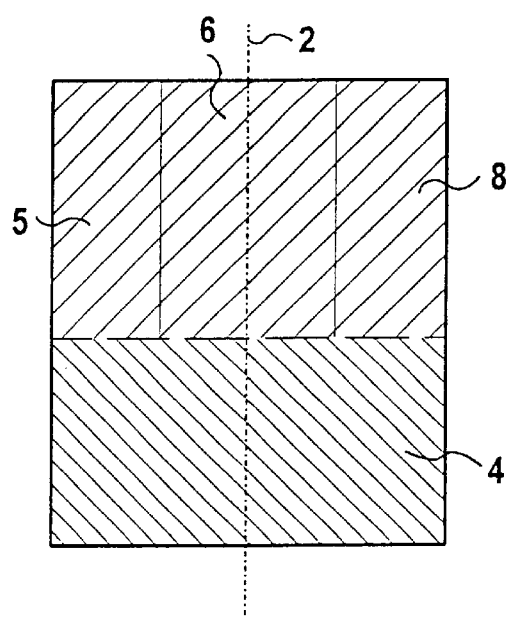

It is also possible for the region 4 and the core region 6 to be produced from the second base material, i.e. the material for the low-pressure part of the steam turbine, and the region 5 to be produced from the first base material, i.e. the high-temperature resistant material of the high-pressure art. As a result, the low-pressure part of the steam-turbine shaft is produced in two operating steps, in which case an annular shell region 8 is produced, for example by conventional forging techniques. The core region 6, which is made of the same material, that is to say the second base material, is filled into this shell region by the ESR process. As a result, it is possible to produce sufficiently large blocks for forging even in ESR installations in which it would not be possible to produce the entire low-pressure part, i.e. the region 5, by filling the core region 6 into the forged shell region 8. FIG. 3 shows a corresponding blank for a turbine shaft 1 having a second region 5 including a shell region 8 and a core region 6.

The invention is distinguished by a combined high-pressure/low-pressure turbine shaft for a steam turbine in which the high-pressure part with the smaller diameter and the low-pressure part with the larger diameter are produced from a respectively similar alloy steel. The alloy steels in this case include 8.0 to 12.5 per cent by weight chromium and, if desired, 0.1 to 1.8 per cent by weight nickel. The nickel content of the high-pressure part is lower than the corresponding content of the low-pressure part. A uniform austenitizing temperature of about 1050° C. can be employed for the turbine shaft as a whole by selecting similar alloy steels, preferably having essentially the same carbide forming elements and nitride-forming elements. The alloy steel of the high-pressure part may include up to 3% by weight cobalt and/or up to 2% by weight Re. Furthermore, the high-pressure part may have a core region close to the axis made of the same alloy as the low-pressure part. This core region is surrounded by a shell region which is made from the particularly high-temperature-resistant alloy steel of the high-pressure part. It is possible to separately take the particular thermal and mechanical stresses in the low-pressure part and high-pressure part into account by selecting different alloy steels in that region of the turbine shaft which is close to the surface. The high-pressure part is constructed in such a way that it has a high hot strength for steam temperatures of 550° C. to 650° C. and the low-pressure part is constructed particularly for high demands placed on the yield strength.

A blank block for the turbine shaft may be produced 100% by the ESR process by melting down a number of electrodes of different chemical compositions or by melting down such electrodes into a prefabricated annular body made of one of the alloy combinations mentioned (first base material, second base material).

We claim:

1. A one-piece turbine shaft oriented along an axis of rotation in a turbine having a high pressure part and a low pressure part, comprising:
   a first axially oriented region with a first maximum radius, said first region forming a high pressure part;
   a second axially oriented region adjoining said first axially oriented region and having a second maximum radius greater than said first maximum radius, said second region forming a low pressure part;
   said first region including a first base material for use at a first temperature of at least 550° C., said second region including a second base material for use at a second temperature lower than said first temperature, said second base material being of a different alloy said first base material; and
   said base materials including alloy steels containing 8.0% by weight to 12.5% by weight Cr with substantially identical austenitizing temperatures.

2. The turbine shaft according to claim 1, wherein said austenitizing temperatures each lie in a range from 950° C. to 1150° C.

3. The turbine shaft according to claim 1, wherein said austenitizing temperatures are 1050° C.

4. The turbine shaft according to claim 1, wherein said first base material and said second base material each have a nickel content of 0.1% by weight to 1.8% by weight, and said second base material has a greater nickel content than said first base material.

5. The turbine shaft according to claim 4, wherein said nickel content of said second base material is more than 0.1% by weight greater than said nickel content of said first base material.

6. The turbine shaft according to claim 1, wherein said second base material includes 9.5% to 10.5% by weight Cr and 1.0% to 1.5% by weight Ni, and said first base material includes 10.0% to 12.0% by weight Cr and 0.2% to 0.6% by weight Ni.

7. The turbine shaft according to claim 1, wherein said second base material includes 9.8% by weight Cr and 1.3% by weight Ni, and said first base material includes 10.0% to 12.0% by weight Cr and 0.2% to 0.6% by weight Ni.

8. The turbine shaft according to claim 1, wherein said first base material includes at least one of 0%–3.0% by weight W, 0%–3.0% by weight Co and 0%–2.0% by weight Re.

9. The turbine shaft according to claim 8, wherein said first base material includes at least one of 2.4%–2.7% by weight W and 2.4%–2.6% by weight Co.

10. The turbine shaft according to claim 8, wherein said first base material includes:
    Mo: 0% to 0.5% by weight;
    V: 0.1% to 0.3% by weight;
    Nb: 0.02% to 0.18% by weight;
    N: 0.01% to 0.07% by weight;
    C: 0.05% to 0.25% by weight;
    deoxidizing elements; and
    production-related impurities, said production-related impurities being at least one of As, Al, P, Sb, Sn, and S.

11. The turbine shaft according to claim 10, wherein said deoxidizing elements are up to 0.15% by weight Si and up to 0.7% by weight Mn.

12. The turbine shaft according to claim 11, wherein said deoxidizing elements contain 0.4%–0.6% by weight Mn.

13. The turbine shaft according to claim 10, wherein at least said first material includes up to 0.03% by weight boron as a further alloying component.

14. The turbine shaft according to claim 10, wherein at least said first material includes 0.005% by weight to 0.02% by weight boron as a further alloying component.

15. The turbine shaft according to claim 8, wherein said first base material includes:
    Mo: 0.15% –0.25% by weight;
    V: 0.15% –0.25% by weight;
    Nb: 0.04% –0.08% by weight;
    N: 0.015% –0.045% by weight;
    C: 0.08% –0.12% by weight;
    deoxidizing elements; and
    production-related impurities, said production-related impurities being at least one of As, Al, P, Sb, Sn, and S.

16. The turbine shaft according to claim 1, wherein said second base material includes:
    1.0% to 1.6% by weight Mo;
    0.15% to 0.25% by weight V;
    0.03% to 0.07% by weight Nb;
    0.03% to 0.06% by weight N;
    up to 0.1% by weight Si;
    0.1% to 0.2% by weight C; and
    up to 0.2% by weight Mn.

17. The turbine shaft according to claim 1, wherein said second base material includes:
    1.4% by weight Mo;
    0.21% by weight V;
    0.05% by weight Nb;
    0.04% by weight N;
    up to 0.1% by weight Si;
    0.16% by weight C; and
    up to 0.2% by weight Mn.

18. The turbine shaft, according to claim 1, wherein said first region has a core region made of said second base material, and a shell region made of said first base material and enclosing said core region.

19. The turbine shaft according to claim 1, wherein said first region serves to receive rotor blades of a high-pressure part of a steam turbine, and said second region serves to receive rotor blades of a low-pressure part of the steam turbine.

* * * * *